United States Patent
Fisk et al.

(10) Patent No.: US 10,740,411 B2
(45) Date of Patent: *Aug. 11, 2020

(54) DETERMINING REPEAT WEBSITE USERS VIA BROWSER UNIQUENESS TRACKING

(71) Applicant: INTERNATIONAL BUSINESS MACHINES CORPORATION, Armonk, NY (US)

(72) Inventors: Frank C. Fisk, Gwinnett, GA (US); Sri Ramanathan, San Ramon, CA (US); Matthew A. Terry, Celebration, FL (US); Matthew B. Trevathan, Roswell, GA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 196 days.

This patent is subject to a terminal disclaimer.

(21) Appl. No.: 15/917,009

(22) Filed: Mar. 9, 2018

(65) Prior Publication Data

US 2018/0196875 A1 Jul. 12, 2018

Related U.S. Application Data

(62) Division of application No. 13/352,582, filed on Jan. 18, 2012, now Pat. No. 9,934,310.

(51) Int. Cl.
*G06F 16/95* (2019.01)
*G06F 3/048* (2013.01)

(52) U.S. Cl.
CPC ............. *G06F 16/95* (2019.01); *G06F 3/048* (2013.01)

(58) Field of Classification Search
CPC ................................. G06F 16/95; G06F 3/048
See application file for complete search history.

(56) References Cited

U.S. PATENT DOCUMENTS 5,991,735 A 11/1999 Gerace
6,073,241 A 6/2000 Rosenberg et al.
(Continued)

FOREIGN PATENT DOCUMENTS

JP 2002324024 11/2002

OTHER PUBLICATIONS

Sveinbjorn Thordarson, "Checking if Cookies are Enables", Sveinbjorn Thordarson's Website. retrieved via Internet Archive Wayback Macine on Jun. 26, 2007, retrieved from <http://web.archive.org/web/20070626121724/http://sveinbjorn.org/cookiecheck>, pp. 1-3.
(Continued)

*Primary Examiner* — Nicholas Klicos
(74) *Attorney, Agent, or Firm* — James Nock; Andrew M. Calderon; Roberts Calderon Safran & Cole, P.C.

(57) ABSTRACT

An approach for determining repeat website users via browser uniqueness tracking includes receiving browser information from a server based on a browser accessing a website. The approach includes creating a browser identifier based on the browser information. The approach includes determining the browser is one of a new visitor and a repeat visitor to the website by comparing the browser identifier to other browser identifiers associated with the website. The approach includes transmitting a message to the server indicating the browser is one of a new visitor and a repeat visitor to the website based on the determining.

20 Claims, 4 Drawing Sheets

(56) References Cited

U.S. PATENT DOCUMENTS

| | | | |
|---|---|---|---|
| 6,088,699 A | 7/2000 | Gampper et al. | |
| 6,112,240 A | 8/2000 | Pogue et al. | |
| 6,496,824 B1 | 12/2002 | Wilf | |
| 6,760,912 B1 | 7/2004 | Yarsa et al. | |
| 7,085,682 B1 | 8/2006 | Heller et al. | |
| 7,117,528 B1 * | 10/2006 | Hyman | H04L 63/08 726/5 |
| 7,330,871 B2 | 2/2008 | Barber | |
| 7,461,120 B1 * | 12/2008 | Artz, Jr. | H04L 63/10 709/203 |
| 7,761,558 B1 | 7/2010 | Jindal et al. | |
| 8,010,500 B2 | 8/2011 | Chun et al. | |
| 8,224,823 B1 | 7/2012 | Amacker | |
| 8,327,000 B2 | 12/2012 | Li | |
| 9,714,926 B2 | 7/2017 | Kirby et al. | |
| 2001/0049635 A1 | 12/2001 | Chung | |
| 2002/0083126 A1 | 6/2002 | Best et al. | |
| 2002/0129114 A1 | 9/2002 | Sundaresan et al. | |
| 2002/0154162 A1 | 10/2002 | Bhatia et al. | |
| 2003/0004897 A1 | 1/2003 | Smith, IV | |
| 2003/0233329 A1 | 12/2003 | Laraki et al. | |
| 2004/0015580 A1 * | 1/2004 | Lu | G06F 11/3495 709/224 |
| 2004/0098229 A1 | 5/2004 | Error et al. | |
| 2005/0021965 A1 | 1/2005 | Van Horn | |
| 2005/0133582 A1 | 6/2005 | Bajikar | |
| 2005/0223093 A1 | 10/2005 | Hanson et al. | |
| 2006/0265495 A1 | 11/2006 | Butler et al. | |
| 2006/0282660 A1 | 12/2006 | Varghese et al. | |
| 2007/0094076 A1 | 4/2007 | Perkowski et al. | |
| 2007/0124290 A1 | 5/2007 | Swanson et al. | |
| 2007/0267492 A1 | 11/2007 | Maclaine Pont | |
| 2007/0277235 A1 | 11/2007 | Barrett et al. | |
| 2008/0114737 A1 | 5/2008 | Neely et al. | |
| 2008/0267500 A1 | 10/2008 | Keswani et al. | |
| 2008/0313026 A1 | 12/2008 | Rose et al. | |
| 2008/0313040 A1 | 12/2008 | Rose et al. | |
| 2009/0037213 A1 | 2/2009 | Eisen | |
| 2009/0106433 A1 | 4/2009 | Knouse et al. | |
| 2009/0157417 A1 | 6/2009 | Bradley et al. | |
| 2009/0157504 A1 | 6/2009 | Braemer et al. | |
| 2009/0307033 A1 * | 12/2009 | Pais | G06Q 30/02 705/7.32 |
| 2010/0004965 A1 | 1/2010 | Eisen | |
| 2010/0017596 A1 | 1/2010 | Schertzinger | |
| 2010/0145960 A1 | 6/2010 | Casteel et al. | |
| 2010/0218106 A1 | 8/2010 | Chen et al. | |
| 2010/0223290 A1 | 9/2010 | Almeida | |
| 2010/0229224 A1 | 9/2010 | Etchegoyen | |
| 2010/0306832 A1 | 12/2010 | Mu et al. | |
| 2010/0325439 A1 | 12/2010 | Dare et al. | |
| 2010/0328115 A1 * | 12/2010 | Binnig | G06F 16/24561 341/51 |
| 2010/0332841 A1 | 12/2010 | Watts et al. | |
| 2011/0185016 A1 | 7/2011 | Kandasamy et al. | |
| 2011/0197136 A1 | 8/2011 | Duke | |
| 2011/0258049 A1 | 10/2011 | Ramer et al. | |
| 2011/0302288 A1 | 12/2011 | Davis | |
| 2012/0016836 A1 | 1/2012 | Fender et al. | |
| 2012/0077298 A1 | 3/2012 | Liang et al. | |
| 2012/0078708 A1 | 3/2012 | Taylor et al. | |
| 2013/0136253 A1 | 5/2013 | Liberman et al. | |
| 2013/0179284 A1 | 7/2013 | Stager | |

OTHER PUBLICATIONS

Atterer et al., "Knowing the User's Evey Move—User Activity Tracking for Website Usability Evaluation and Implicit Interaction", May 26. ACM, pp. 203-212.

Strom, S., "New Charges of Cheating Tarnish Pepsi Fund-Raising contest for Nonprofits", http://www.nytimes.com/2011/01/06/business/06charity.html?_r=2&ref=business, The New York Times, Jan. 5, 2011, pp. 1-3.

Author Unknown, "Panopticlick", http://panopticlick.eff.org/, Electronic Frontier Foundation, downloaded Nov. 10, 2011, 1 page.

Gemal, H., "BrowserSPY.dk", http://browserspy.dk/,downloaded Nov. 10, 2011, 1 pp. 1-3.

Author Unknown, "Analyze". http://privacy.net/analyze/, Consumer.net LLC, downloaded Nov. 10, 2011, 1 page.

Author Unknown, "Privacy.net", http://pivacy.net/, Consumer.net LLC, downloaded Nov. 10, 2011, 1 page.

Author Unknown, "CAPTCHA: Telling Humans and Computers Apart Automatically", http://www.captcha.net/, Carnegie Mellon University, 2010, pp. 1-4.

* cited by examiner

FIG. 1

System
Platform: WinXP
Operating System: OS.type.7
Win16: False
WinInstallerMinVer: 2

Browser Type and Version
Browser type: browser.type.m
Browser version: 7.0
ServicePack: 0
Build: 7,0,5730,13
Crawler: False

Cookies
Session cookies: Enabled
Permanent cookies: Enabled

Security
JvScriptEnabled: True
VBScriptEnabled: True
JvEnabled: True
ActXEnabled: True
SSL: True
PopupsBlocked: True
ImagesEnabled: True
HighSecurity: False

Connection
ConnectionType: lan
Proxy: False
CompressGZip: True

Display and Layout
Width: 1600
WidthAvail: 1246
Height: 900
StyleSheets: True
PNG: True
FontSmoothing: True
FontColor: True
FontSize: True
TextSize: 7
Tables: True
TableBGColor: True
TableBGImage: True
ColorDepth: 32
Frames: True
Dots Per Inch X Actual: 96
Dots Per Inch Y Actual: 96
Dots Per Inch X Logical: 96
Dots Per Inch Y Logical: 96
Background Sounds: True

Plugins
Plugin#1 Version: 8.3.1.
Plugin#2 Not Installed.
Plugin#3 Not Installed.
Plugin#4 Not Installed.
Plugin#5 Not Installed.
Plugin#6 Version: 11,0,1,152.
Plugin#7 Not Installed.
Plugin#9 Not Installed.
Plugin#10 Not Installed.
Plugin#11 Version: 9.0.4510.

Scripting
ActXControls: True
ActXEnabled: True
JvScript: True
JvScriptEnabled: True
JvScriptVer: 1.5
JvScriptBuild:
VBScript: True
VBScriptEnabled: True
VBScriptBuild:
XML: True
XMLHttpRequest: True
DHTML: True
FileUpload: Yes
Channel Definition Format: True
MouseOver: True

Jv
JvApplets: True
JvEnabled: True
MSJVM DLL Build: 5,0,5000,0

Wireless Devices
PDA: False
WAP: False
HDML: False

Locale
Language: English
User Language: en-us
System Language: en-us
Time Zone Difference: 0

DETERMINING REPEAT WEBSITE USERS VIA BROWSER UNIQUENESS TRACKING

TECHNICAL FIELD

The present invention generally relates to managing website access and, more particularly, to methods and systems for determining repeat website users via browser uniqueness tracking.

BACKGROUND

Internet websites routinely permit users to register with the website for a variety of reasons, such as email services, auction events, online polling, and gaming. With the advent of so many services being provided via the Internet, some users are employing computer programs (e.g., bots, netbots, etc.) to automatically register plural times at a single website in order to commercially exploit and/or abuse the services. For example, software may be used to automatically register for thousands of free email accounts, which may be subsequently used in sending spam email. As another example, software may be used to automatically register at websites in order to post comments into blogs for the purpose of inserting keywords into the website to artificially raise search engine rankings. As an even further example, software may be used to automatically register over and over again at a website to submit thousands of votes in an online poll. Such automated, software-based registration is typically used for commercial promotion and/or other purposes, and often degrades the quality of service for legitimate users.

A number of tools have been developed to combat automated registration to avoid such abuse. The tools typically involve a challenge that is easily answered by a human user but difficult for a computer to answer. One such tool is to ask random questions that must be answered to obtain access to the website. Another tool is referred to as a CAPTCHA (Completely Automated Public Turing test to tell Computers and Humans Apart), which is a type of challenge-response test used in computing as an attempt to ensure that the response is generated by a person. The CAPTCHA process usually involves one computer (a server) asking a user to complete a simple test which the computer is able to generate and grade. Because other computers are assumed to be unable to solve the CAPTCHA, any user entering a correct solution is presumed to be human. A common type of CAPTCHA requires the user to type letters or digits from a distorted image that appears on the screen.

Tools such as CAPTCHA have slowed but not eliminated unwanted automated registration. This is because methods have been devised for circumventing CAPTCHA-like tools. For example, software programs have been developed that can recognize and answer the earliest types of CAPTCHA tests using, for example, computer-based segmentation and optical character recognition techniques. Also, some CAPTCHA implementations use only a small fixed pool of CAPTCHA images, and storing matched sets of query and solution can be used to bypass the tool for small sets of queries. Lastly, low cost human operators can be used to answer plural website registration challenges on a massive scale.

Current technology thus does not adequately prevent or limit bots and humans from repetitive registrations on a website. Although CAPTCHA, random question, and other tools slow automated registration, these tools do not eliminate automated registration and do not detect fraudulent (e.g., plural) registrations by a single user.

SUMMARY

In a first aspect of the invention, a method implemented in a computer infrastructure includes receiving browser information from a server based on a browser accessing a website. The method also includes creating a browser identifier based on the browser information. The method also includes determining the browser is one of a new visitor and a repeat visitor to the website by comparing the browser identifier to other browser identifiers associated with the website. The method also includes transmitting a message to the server indicating the browser is one of a new visitor and a repeat visitor to the website based on the determining.

In another aspect of the invention, there is a system implemented in hardware and comprising a processor executing a browser tag tool that operates to receive browser information from a website server based on a browser accessing a website hosted by the website server. The browser tag tool also operates to create a browser tag using values contained in the browser information. The browser tag tool also operates to determine the browser is one of a new visitor and a repeat visitor to the website by comparing the browser tag to other browser tags associated with the website. The browser tag tool also operates to transmit a message to the website server indicating the browser is one of a new visitor and a repeat visitor to the website based on the determining.

In an additional aspect of the invention, there is a computer program product comprising a computer usable tangible storage medium having readable program code embodied in the tangible storage medium. The computer program product includes at least one component operable to: receive a request from a browser to register at a website; obtain browser information from the browser in association with the request; forward the browser information to a browser tag tool; and receive an indication from the browser tag tool that one of: the browser has previously registered with the website, and the browser has not previously registered with the website.

In a further aspect of the invention, there is a computer system for determining repeat user visits to a website. The system comprises a CPU, a computer readable memory and a computer readable storage media. Additionally, the system comprises first program instructions to receive a request from a browser to register at a website, wherein the website offers a service comprising at least one of: email, voting, auctioning, and gaming; second program instructions to obtain browser information from the browser in association with the request; third program instructions to forward the browser information to a browser tag tool; fourth program instructions to receive an indication from the browser tag tool that the browser has previously registered with the website, wherein the indication is based on a browser tag that is based on the browser information; fifth program instructions to receive the browser tag from the browser tag tool; sixth program instructions to grant the browser access to the service; and seventh program instructions to store a record comprising: an action taken by the browser during using the service, the browser tag, and a time the action was taken. The first, second, third, fourth, fifth, sixth, and seventh program instructions are stored on the computer readable storage media for execution by the CPU via the computer readable memory.

In another aspect of the invention, there is a method of deploying a system for determining repeat user visits to a website. The method includes providing a computer infrastructure operable to: receive a request from a browser to register at a website; obtain browser information from the browser in association with the request; create a browser tag using values contained in the browser information; determine the browser is one of a new visitor and a repeat visitor to the website by comparing the browser tag to other browser tags associated with the website; store the browser tag with the other browser tags associated with the website; and maintain a record of the browser tag and actions performed by the browser at the website. The receiving, the obtaining, and the maintaining are performed by a website server hosting the website. The creating, the determining, and the storing are performed by a browser tag tool. The website server and the browser tag tool are one of: comprised in a same computing device, and comprised in separate computing devices that communicate with one another.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

FIGS. 2-5 show exemplary data structures in accordance with aspects of the invention;

DETAILED DESCRIPTION

The present invention generally relates to managing website access and, more particularly, to methods and systems for determining repeat website users via browser uniqueness tracking. Methods and systems in accordance with aspects of the invention provide a tool for generating and storing a unique browser identifier of a web browser when the browser is used for registering at a website. The browser identifier may be employed to determine when a same browser is being used to register multiple times at a website. In embodiments, the browser identifier comprises a tag containing information that is obtained from a browser when the browser visits a website. The information may include, for example, browser type and version, cookies preferences, connection details, fonts, etc., which is available to a website server when a browser accesses a website hosted by the server. In this manner, implementations of the invention advantageously may be used to detect plural registrations at a website for the purpose of taking action upon such detection.

System Environment

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
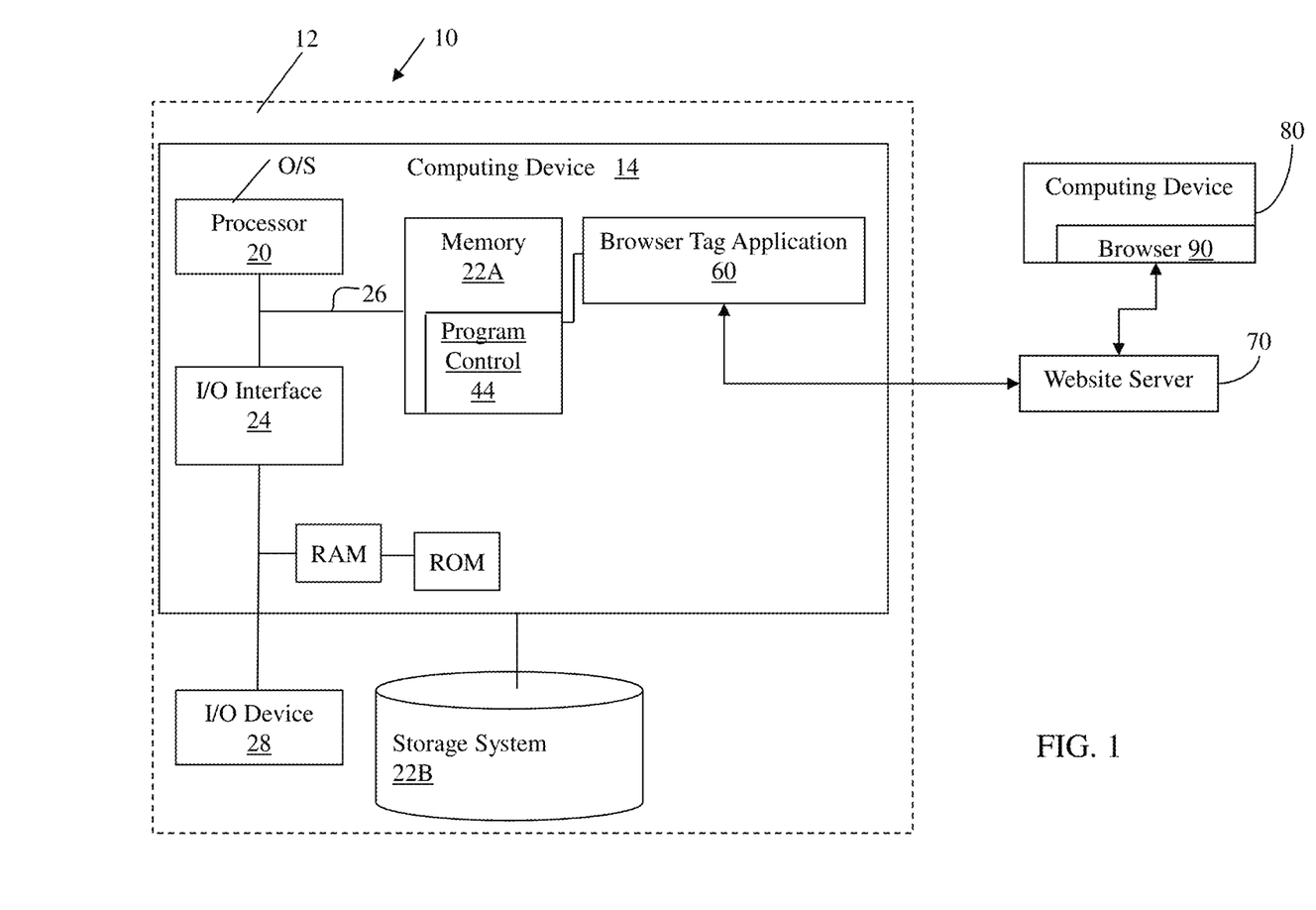
FIG. 1 shows an illustrative environment for implementing the steps in accordance with aspects of the invention.

FIG. 1 shows an illustrative environment 10 for managing the processes in accordance with the invention. To this extent, the environment 10 includes a server or other computer infrastructure 12 that can perform the processes described herein. In particular, the computer infrastructure 12 includes a computing device 14. The computing device 14 can be resident on a network infrastructure or computing device of a third party service provider (any of which is generally represented in FIG. 1).

The computing device 14 also includes a processor 20, a memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S). The memory (e.g., 22A) may store business intelligence, data mining, regression analysis and/or modeling and simulation tools for execution by the processor 20.

The computing device 14 is in communication with the external I/O device/resource 28 and the storage system 22B. For example, the I/O device 28 can comprise any device that enables an individual to interact with the computing device 14 (e.g., user interface) or any device that enables the computing device 14 to communicate with one or more other computing devices using any type of communications link. The external I/O device/resource 28 may be for example, a handheld device, PDA, handset, keyboard etc.

In general, the processor 20 executes computer program code (e.g., program control 44), which can be stored in the memory 22A and/or storage system 22B. Moreover, in accordance with aspects of the invention, the program control 44 controls a browser tag tool 60 that performs, e.g., the processes described herein. The browser tag tool 60 can be implemented as one or more program code in the program control 44 stored in memory 22A as separate or combined modules. Additionally, the browser tag tool 60 may be implemented as separate dedicated processors or a single or several processors to provide the function of these tools.

While executing the computer program code, the processor 20 can read and/or write data to/from memory 22A, storage system 22B, and/or I/O interface 24. The program code executes the processes of the invention. The bus 26 provides a communications link between each of the components in the computing device 14.

In accordance with aspects of the invention, the browser tag tool 60 is operatively connected to and in communication with a website server 70. The website server 70 may host a website that is accessible by a computing device 80 comprising a browser 90. The browser 90 may be any suitable web browser, such as a software application for retrieving, presenting, and traversing information resources on the World Wide Web. The computing device 80 may be any suitable computing device capable of executing the browser 90, including but not limited to a personal computer, workstation, laptop computer, personal digital assistant, tablet computer, notebook computer, netbook computer, smartphone, etc. In embodiments, the browser tag tool 60 is configured to perform one or more of the processes described herein including, but not limited to: receive browser information from the website server 70, create a browser tag for the browser 90 using the browser information, compare the browser tag to stored browser tags, save the browser tag, and communicate results of the comparison to the website server 70. In this manner, the browser tag tool 60 may be used to detect when a same browser is being used to attempt plural registrations at a website.

In accordance with aspects of the invention, the browser tag tool 60 and the website server 70 may be associated with a single computing device or different computing devices. For example, the browser tag tool 60 may be a software program running on a first computing device 14, and the website server 70 may be a second computing device that is separate from but in communication with the first computing device 14. Alternatively, the website server 70 may comprise or be comprised in the same computing device 14 as the browser tag tool 60.

The computing device 14 can comprise any general purpose computing article of manufacture capable of executing computer program code installed thereon (e.g., a personal computer, server, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computer infrastructure 12 is only illustrative of various types of computer infrastructures for implementing the invention. For example, in embodiments, the computer infrastructure 12 comprises two or more computing devices (e.g., a server cluster) that communicate over any type of communications link, such as a network, a shared memory, or the like, to perform the process described herein. Further, while performing the processes described herein, one or more computing devices on the computer infrastructure 12 can communicate with one or more other computing devices external to the computer infrastructure 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

FIG. 2 shows an example of browser information 100 that may be obtained by a website server (e.g., website server 70) from a browser (e.g., browser 90) when the browser accesses a website hosted by the website server. Browser information may be obtained by the website server using conventional methodologies that access and analyze information stored on computing device (e.g., computing device 80) associated with the browser when the browser accesses the website, e.g., via an Internet connection.

As depicted in FIG. 2, the browser information 100 may include categories of information relating to, for example, System, Browser Type and Version, Cookies, Security, Connection, Display and Layout, Plugins, Scripting, Java® (Java is a registered trademark of Oracle America, Inc.), Wireless Devices, Locale, etc. Other categories are also contemplated by the present invention. Each category may include one or more parameters. For example, in the browser information shown in FIG. 2, the "System" category includes four parameters (e.g., Platform, Operating System, Win16, and WinInstallerMinVer), and the "Browser Type and Version" category includes five parameters (e.g., Browser type, Browser version, ServicePack, Build, and Crawler). Each parameter may, in turn, have a value selected from one or more possible values. For example, in the browser information shown in FIG. 2, the Operating System parameter has the value "OS.type.7" and the Browser type parameter has the value "browser.type.m".

Figure 3:
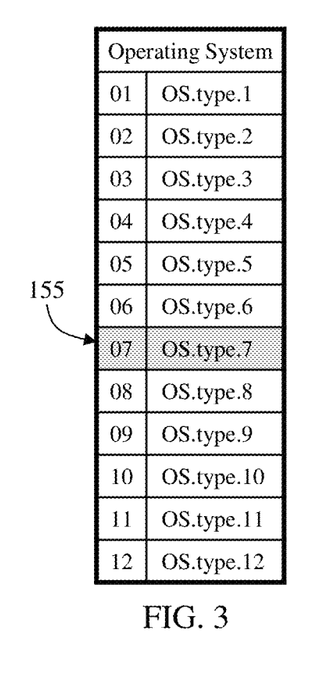
Figure 4:
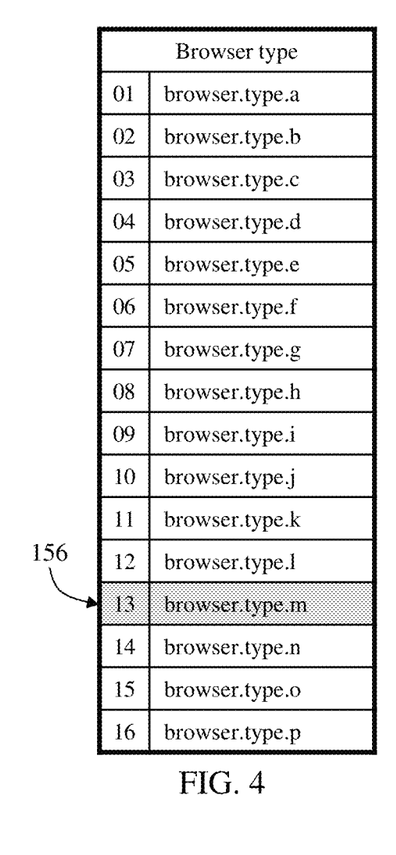
Figure 5:
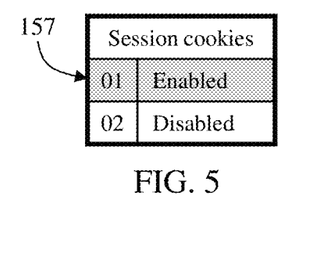

FIGS. 3-5 show data structures in accordance with aspects of the invention, which comprise exemplary values for particular parameters of the browser information from FIG. 2. More specifically, FIG. 3 shows twelve possible values for the Operating System parameter, which may correspond to twelve different types of operating systems that may be running on the computing device associated with the browser (e.g., computing device 80). FIG. 4 shows sixteen possible values for the Browser type parameter, which may correspond to sixteen different types of browsers (e.g., browser 90). Similarly, FIG. 5 shows two possible values for the Session cookie parameter. Other categories are also contemplated by the present invention.

In accordance with aspects of the invention, each value in a list of possible values of a parameter is associated with a code. The code may be numeric, alphabetical, alpha-numeric, or any other suitable code. For example, codes 00, 01, 02, . . . , 12 are associated with the twelve values of the Operating System parameter shown in FIG. 3, with reference number 155 representing the code "07" that is associated with the value "OS.type.7". Similarly, codes 00, 01, 02, . . . , 16 are associated with the sixteen values of the Browser type parameter shown in FIG. 4, with reference number 156 representing the code "13" that is associated with the value "browser.type.m". In a similar manner, codes 00 and 01 are associated with the two values of the Session cookie parameter shown in FIG. 5, with reference number 157 representing the code "01" that is associated with the value "Enabled".

In accordance with aspects of the invention, the browser tag tool (e.g., browser tag tool 60) stores data structures, such as those shown in FIGS. 3-5, that define the possible values and associated codes for each parameter included in the browser information 100. In embodiments, the browser tag tool receives the browser information from the website server, uses the data structures to look up the code associated with each value contained in the browser information, and creates a browser tag (e.g., a unique identifier) using the looked-up codes. The browser tag may be used as an identifier for the browser (e.g., browser 90) useful in determining whether the browser has previously visited the website. In this manner, the browser tag may be regarded as a unique signature or fingerprint of a particular browser.

Figure 6:
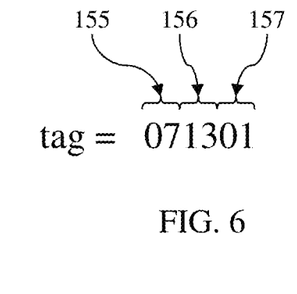
FIG. 6 shows an exemplary browser identifier in accordance with aspects of the invention.

The looked-up codes (e.g., the codes corresponding to the values contained in the browser information) may be combined, modified, and/or operated on in any suitable manner to create the browser tag. For example, in one embodiment depicted in FIG. 6, the looked-up codes 155, 156, and 157 are concatenated to form the browser tag "071301". However, the present invention is not limited to this single example of browser tag creation, and other more complex techniques (such as applying a hash function) may be used within the scope of the invention to create a browser tag from the browser information.

Any desired number of parameters/values of browser information may be used to create a browser tag in accordance with aspects of the invention. For example, the browser information 100 shown in FIG. 2 contains seventy-six values corresponding to seventy-six parameters, and a browser tag may be created from any combination of two or more values of these seventy-six parameters. The browser tag depicted in FIG. 6, for example, is created from three values of the seventy-six parameters.

In embodiments, each individual website server (e.g., website server 70) designates which parameters to use in creating a browser tag. In this manner, each individual website administrator has the ability to customize its level of uniqueness of browser tags, since using a greater number of parameters in creating browser tags provides more unique browser tags, e.g., compared to using a lesser number of parameters in creating the browser tags which provides less unique browser tags.

In further embodiments, a website server may change the parameters used in creating a browser tag for a website after a period of time. For example, a website server may designate that a first set of parameters are used for browser tag creation for a first time period. Then, at a later date, the website server may designate that a different second set of browser parameters are used for browser tag creation. This strategy may be used to defend against hackers who might have determined how to circumvent browser tags based on a given set of parameters.

Moreover, parameters other than those described herein may be used within the scope of the invention. For example, the browser information for a particular browser (e.g., browser 90) may contain more or less than seventy-six parameters as shown in FIG. 2. Additionally or alternatively, the browser information for a particular browser may contain different specific parameters and/or different categories of parameters than those shown in FIG. 2. Accordingly, the browser tag tool may store a large number (e.g., hundreds) of data structures, such as those shown in FIGS. 3-5, corresponding to an expected total number of possible parameters.

Additionally, values other than those described herein may be used within the scope of the invention. For example, the browser information may contain more or less than the twelve values of the Operating System parameter shown in FIG. 3. Additionally or alternatively, the browser information may contain different values than those shown in FIG. 3, e.g., corresponding to different types of operating systems not included in FIG. 3.

In embodiments, the browser tag tool (e.g., browser tag tool 60) populates and maintains the values and codes in data structures, such as look-up tables shown in FIGS. 3-5, stored in data storage (e.g., memory 22A and/or storage system 22B). Each data structure corresponding to a browser parameter may comprise data defining possible values for that parameter and respective codes associated with the possible values. The data structures may be pre-defined in data stored by the browser tag tool. Additionally or alternatively, the browser tag tool may periodically poll trusted sources (e.g., service providers) for obtaining updates (e.g., at least one of changes, omissions, or additions) to the values in each data structure. Similarly, the browser tag tool may add new data structures (e.g., corresponding to new browser parameters) including new possible values based such polling of trusted sources.

In embodiments, the browser tag tool does not add new values and/or parameters upon receipt of such new values and/or parameters as part of browser information from a website server. This is because a spam browser or spam server could add illegitimate values and/or parameters to the browser information in an attempt to obtain a unique browser tag. Accordingly, in embodiments, only known values and parameters from trusted sources are used in creating the browser tags.

In accordance with aspects of the invention, browser tags that are created by the browser tag tool are stored in persistent data storage, such as storage system 22B of FIG. 1. A single browser tag tool may be used with a plurality of websites, in which case the browser tag tool saves each browser tag in association with a particular one of the plurality of websites. In this manner, when a new browser tag is created (e.g., for a browser currently attempting to register at a particular website), the browser tag tool compares the new browser tag to a stored list of existing browser tags for this particular website to determine whether the browser currently registering with the website has previously registered with the website (e.g., whether the browser is a new visitor or a repeat visitor at the website). When the new browser tag matches a browser tag that already exists for this website, it is concluded that the browser currently attempting to register at the website has been used to register at this website in the past. On the other hand, when the new browser tag does not match a browser tag that already exists for this website, it is concluded that the browser currently attempting to register at the website has not registered at this website in the past. In this manner, the browser tag tool may be used to detect when a particular browser attempts plural registrations at a particular website.

According to further aspects of the invention, the browser tag tool deletes a browser tag from the persistent data storage after the browser tag has been saved for a predetermined amount of time. There are a finite number of unique tags that can be created for any combination of parameters and values of browser information. Periodically deleting older browser tags reduces the possibility of detecting identical browser tags for two different legitimate users for a same website.

Flow Diagrams

Figure 7:
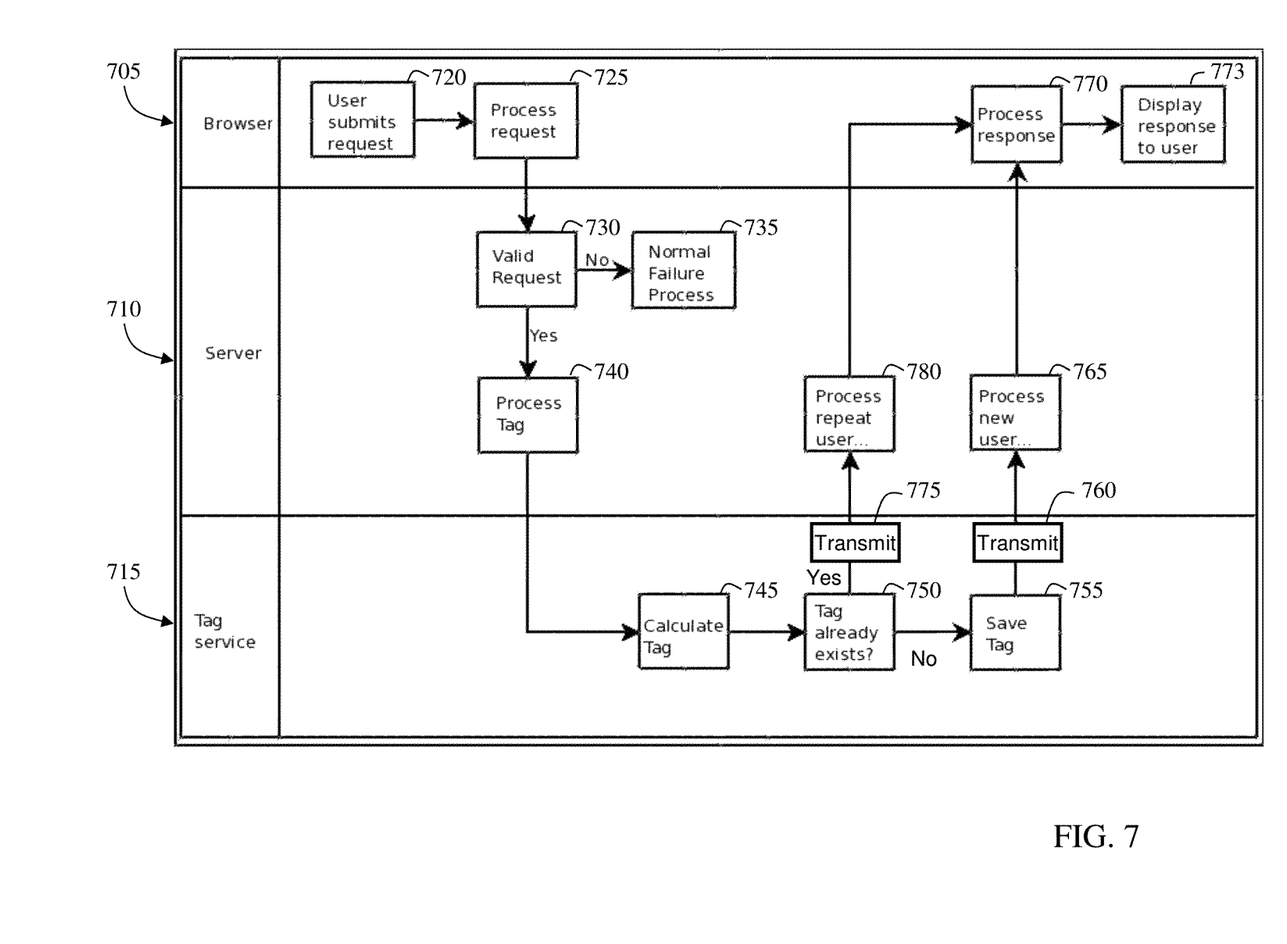
FIG. 7 shows an exemplary block diagram in accordance with aspects of the invention.

FIG. 7 shows an exemplary flow diagram for performing aspects of the present invention. The steps of FIG. 7 may be implemented in the environment of FIG. 1 and using the techniques described with respect to FIGS. 2-6, for example.

The flowcharts, block diagrams, and/or swim lane diagrams shown and described herein illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

FIG. 7 depicts an exemplary swim lane diagram for a process of browser identification in accordance with aspects of the invention. The swim lane diagram includes three actors: lane 705 represents functions performed at/by the browser (e.g., browser 90), lane 710 represents functions performed at/by the website server (e.g., website server 70), and lane 715 represents functions performed at/by the browser tag tool (e.g., browser tag tool 60). At step 720, a user employs a browser (e.g., browser 90) to submit a request at a website. The request may be, for example, an attempted registration at the website for email, polling, gaming, etc. Step 720 may comprise, for example, the user accessing the website, entering information requested by the website using an I/O device, and pressing or clicking a submit or enter button. The requested information may comprise any desired information as defined by the website, including but not limited to: name, username, password, mailing address, email address, telephone number, CAPTCHA response, etc.

At step 725, the browser processes the request. This may comprise the browser formatting the request as data and transmitting the data to the website server (e.g., website server 70). Step 725 may also comprise the browser transmitting the browser information (e.g., similar to browser information 100) to the website server.

At step 730, the website server determines whether the request is valid. For example, the website server determines whether the user correctly provided all of the requested information at step 720, e.g., in a conventional manner. As but one example, the website server may determine validity by determining whether the user filled out all of the required fields of the requested information. As another example, if the requested information includes a CAPTCHA response, step 730 may comprise determining whether the user correctly answered the CAPTCHA, which may be performed in a conventional manner.

When the website server determines at step 730 that the request is invalid (e.g., the user did not correctly provide all of the requested information), then at step 735 the website server processes the invalid request in a conventional manner. This may comprise, for example, the website server sending a failure message to the browser and denying the browser access to the requested service and/or website.

On the other hand, when the website server determines at step 730 that the request is valid (e.g., the user correctly provided all of the requested information), then at step 740 the website server communicates the browser information to the browser tag tool. This may comprise, for example, the website server calling a computing device (e.g., computing device 14) running the browser tag tool and transmitting the browser information to the computing device. Step 740 may also comprise the website server transmitting data to the browser tag tool indicating which parameters/values of the browser information are to be used in creating the browser tag, either by sending only those parameters/values to the browser tag tool or by sending all of the browser information and a list of the parameters to be used. In this manner, the website server dictates which parameters to use in creating browser tags for a particular website.

At step 745, the browser tag tool (e.g., browser tag tool 60) creates a browser tag based on the browser information. In embodiments, this is performed in a manner similar to that described with respect to FIGS. 2-6. For example, the browser tag tool receives the browser information including parameters and values of parameters. The browser tag tool may then compare the parameters and values of parameters to stored data structures to determine (e.g., look up) a code associated with each value. The browser tag tool may then create a browser tag based on the determined codes, e.g., by concatenating the codes, to form the browser tag for this particular browser for this particular website.

At step 750, the browser tag tool compares the new browser tag from step 745 to other browser tags for this website. In embodiments, the other browser tags are stored in a persistent data store, and the browser tag tool accesses the data store and compares the new browser tag to the existing browser tags. The comparing may be performed using conventional data comparison techniques, such as a diff process, etc.

When the browser tag does not already exist, e.g., the new browser tag is not the same as a stored browser tag for this website, the process proceeds to step 755. At step 755, the browser tag tool saves the new browser tag in the persistent data storage for this website. In this manner, the browser tag from step 745 may be used in future comparisons to other browser tags during subsequent requests to access this website.

At step 760, the browser tag tool informs the website server that the browser is a new browser (e.g., new visitor or new user) for this website, i.e., the browser is not a repeat user. This may comprise the browser tag tool transmitting appropriate data, including the browser tag, to the website server.

At step 765, the website server processes the request in any desired manner suitable for new users. For example, step 765 may comprise the website server generating and transmitting a response to the browser that the request to access the website is successful. Step 765 may also comprise, for example, the website server granting the browser access to one or more services provided by the website, such as email, polling, gaming, etc.

At step 770, the browser processes the response from the website server. This may include, for example, at step 773, displaying a response message to the user that the request for access to the website has been granted.

Referring back to step 750, when the browser tag tool determines that the new browser tag created at step 745 already exists, e.g., the new browser tag is the same as a stored browser tag for this website, then at step 775 the browser tag tool transmits to the website server an indication that this is a repeat user (e.g., repeat visitor) for this website. This may comprise the browser tag tool transmitting appropriate data, including the browser tag, to the website server.

At step 780, the website server processes the indication of a repeat user according to the business rules of the website. For example, the website server may deny the browser access to the requested website and/or services provided by the website.

Alternatively to denying the repeat user access, the website server may grant the repeat user access to the requested website and/or service and maintain a record of the repeated access by this browser. The record may comprise stored data associated with the browser tag indicating that actions taken at the website using this browser are potentially fraudulent. This record may be used at a later time and in conjunction with other data, such date and time of registering with the website, to determine how frequently the browser is registering with the website and/or how frequently the browser is utilizing the services provided by the website.

For example, in a polling (e.g., online voting) website embodiment, the website server may permit the user of the browser to vote in the poll even after determining that this is a repeat user. In such a polling embodiment, the website server may save a browser tag with each vote cast without taking any action in real time, e.g., during voting, to deal with repeat users. At a later time, the website server may analyze the votes and associated browser tags, and any other information such as a date and time saved with each vote, to determine whether a particular browser violated the rules of the voting, e.g., voted more than a predefined number of times within a specified time period. In this manner, the website server may avoid expending resources unnecessarily, and has the option of analyzing votes and associated browser tags in a post processing action should the need arise.

Step 780 may further comprise the website server transmitting a response to the browser regarding the browser's request to access the website. The response may be an indication that the browser is being denied access based on being a repeat user. Alternatively, the response may be an indication that the browser is being granted access. Optionally, when the repeat user is granted access, the response from the website server to the browser may include an indication that the website server is aware that this is a repeat visit by this browser.

Following step 780, the process proceeds to step 770 where the browser processes the response from the website server. This may include, for example, at step 773, displaying a response message to the user that the request for access to the website has been denied or granted.

As described herein, the browser tag may be used as an additional layer of website security, e.g., in addition to a CAPTCHA test. Implementations of the invention curtail human users from repeatedly availing themselves of services provided by websites, since a repeat user would have to change their browser configuration each time they wanted to perform a subsequent registration. Implementations of the invention non-human users, e.g., automated computer programs, from repeatedly availing themselves of services provided by websites by creating the browser tag from known parameters from trusted sources, and optionally by periodically changing the parameters used to create a browser tag for a particular website.

Additionally, implementations of the invention have browser, platform, and operating system independence. For example, implementations of the invention may be used with all types of browsers, platforms, and operating systems provided that the browser information has standard parameters used in creating the browser tag.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if applicable, are intended to include any structure, material, or act for performing the function in combination with other claimed elements as specifically claimed. Moreover, while the invention has been described in terms of embodiments, those of ordinary skill in the art will recognize that the invention can be practiced with modifications and in the spirit and scope of the appended claims.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein

What is claimed is:

1. A system implemented in hardware, comprising:
a processor executing a browser tag tool that operates to:
receive, at the browser tag tool, browser information from a website server based on a browser accessing a website hosted by the website server, wherein the browser comprises a software application, and wherein the browser information is comprised of: a plurality of parameters and a respective value for each one of the plurality of parameters;
receive, at the browser tag tool, from the website server, data indicating which parameters, among the plurality of parameters, are to be used in creating a browser tag;
create the browser tag using values contained in the indicated parameters of the browser information which the data indicates are to be used to create the browser tag;
determine whether the browser a new visitor or a repeat visitor to the website by comparing the browser tag to other browser tags associated with the website;
in response to determining that the browser is a repeat visitor, determine whether the browser is attempting multiple registrations at the website;
transmit a message to the website server indicating the browser is a new visitor or a repeat visitor to the website based on the determining; and
in response to determining that the browser is a repeat visitor attempting multiple registrations at the website, grant access to services provided by the website, but advise the repeat visitor that the website server is aware of the attempts for multiple registration,
wherein the processor further operates to, in response to determining that the browser is the repeat visitor attempting the multiple registrations at the website, maintain a record of the attempted multiple registrations of the browser, permit the repeat visitor to enter a plurality of votes in polls, and, after permitting the repeat visitor to enter the plurality of votes, analyze the plurality of votes to limit the browser to a predefined number of votes within a specified time period, and
the website server saves the browser tag, a date, and a time associated with each of the votes entered.

2. The system of claim 1, wherein the creating further comprises:
determining, for each indicated parameter, a value of the browser corresponding to that indicated parameter;
comparing the determined value for each indicated parameter with a plurality of possible values in a data structure being comprised of exemplary values of respective ones of the indicated parameters of the browser information; and
determining a code from the data structure for the browser for each indicated parameter.

3. The system of claim 2, wherein the creating further comprises combining the determined codes into a numerical string of data to form the browser tag.

4. The system of claim 3, wherein the plurality of parameters includes at least one of an operating system type of the browser, a browser type of the browser, and whether cookies are enabled or not for the browser.

5. The system of claim 4, wherein the determined codes include at least one of an operating system type of the browser, a browser type of the browser, and whether cookies are enabled or not for the browser.

6. The system of claim 1, further comprising:
transmitting the browser tag to the website server; and
saving the browser tag with the other browser tags in persistent storage in the website server.

7. The system of claim 1, wherein the website server is separate from and in communication with the browser tag tool.

8. The system of claim 1, wherein the website server is further configured to receive a request from the browser to register at the website and determine whether the browser voted more than the predefined number of times within the specified time period, the browser information includes a name, a username, a password, a mailing address, an email address, a telephone number, and a Completely Automated Public Turing test to tell Computers and Humans Apart (CAPTCHA) response, the polls comprise online voting, and the browser tag is saved in real time.

9. A method implemented in a computer infrastructure, comprising:
receiving, at a browser tag tool, browser information from a website server based on a browser accessing a website which includes the website server, wherein the browser comprises a software application, and wherein the browser information is comprised of a plurality of parameters and a respective value for each one of the plurality of parameters;
receiving, at the browser tag tool, from the website server, data indicating which parameters, among the plurality of parameters of the browser information, are to be used in creating a browser identifier;
creating the browser identifier based on the indicated parameters of the browser information which the data indicates are to be used to create the browser identifier;
determining that the browser is a repeat visitor to the website by comparing the browser identifier to other browser identifiers associated with the website;
in response to determining that the browser is a repeat visitor, determining that the browser is attempting multiple registrations at the website;
transmitting a message to the website server indicating the browser is a repeat visitor to the website based on the determining; and
in response to determining that the browser is a repeat visitor attempting multiple registrations at the website, granting access to services provided by the website, but advising the repeat visitor that the website server is aware of the attempts for multiple registration, and
in response to determining that the browser is the repeat visitor attempting the multiple registrations at the website, maintaining a record of the attempted multiple registrations of the browser, permit the repeat visitor to enter a plurality of votes in polls, and, after permitting the repeat visitor to enter the plurality of votes, analyze the plurality of votes to limit the browser to a predefined number of votes within a specified time period,
wherein the website server saves the browser tag, a date, and a time associated with each of the votes entered.

10. The method of claim 9, wherein:
the creating comprises accessing a plurality of data structures, each one of the plurality of data structures being comprised of exemplary values for respective ones of the indicated parameters of the browser information; and
each respective one of the plurality of data structures comprises a plurality of possible values associated with the corresponding respective one of the indicated parameters, and a plurality of codes associated with the plurality of possible values.

11. The method of claim 10, wherein the creating further comprises:
determining, for each indicated parameter, a value of the browser corresponding to that parameter;
comparing the determined value for each indicated parameter with the plurality of possible values in the data structure for each indicated parameter;
determining a code from the data structure for the browser for each indicated parameter; and
combining the determined codes for each indicated parameter into a numerical string of data to form the browser identifier which includes the determined codes for the operating system type of the browser, the browser type and whether cookies are enabled or not for the browser.

12. The method of claim 9, wherein the transmitting comprises transmitting the browser identifier to the website server, the website server is further configured to receive a request from the browser to register at the website and determine whether the browser voted more than the predefined number of times within the specified time period, the browser information includes a name, a username, a password, a mailing address, an email address, a telephone number, and a Completely Automated Public Turing test to tell Computers and Humans Apart (CAPTCHA) response, the polls comprise online voting, and the browser tag is saved in real time.

13. The method of claim 12, wherein the website offers a service comprising at least one of: email, voting, auctioning, and gaming.

14. The method of claim 12, wherein the receiving of browser information and data from the website server is based on the browser registering at the website to gain access to the service.

15. A computer system for determining repeat user visits to a website, the system comprising:
a CPU, a computer readable memory, and a computer readable storage media;
first program instructions to receive, by a website server, a request from a browser to register at a website, wherein the browser comprises a software application;
second program instructions to obtain, by the website server, browser information from the browser in association with the request, wherein the browser information is comprised of a plurality of parameters and a respective value for each one of the plurality of parameters;
third program instructions to forward, by the website server, the browser information to a browser tag tool, and to forward, by the website server, which parameters, among the plurality of parameters, of the browser information are to be used for creating a browser tag;
fourth program instructions to receive, by the website server, an indication from the browser tag tool that the browser has previously registered with the website, wherein the indication is based on a comparison of the browser tag that is based on the browser information with other browser tags for the website;
in response to receiving an indication that the browser has previously registered with the website, fifth program instructions to determine whether the browser is attempting multiple registrations at the website;
in response to determining that the browser has previously registered with the website and is attempting multiple registrations at the website, sixth program instructions to grant access to services provided by the website to the previously registered browser, but advise the repeat visitor that the website server is aware of the attempts for multiple registration; and
in response to determining that the browser is the repeat visitor attempting the multiple registrations at the website, the sixth program instructions to maintain a record of the attempted multiple registrations of the browser, permit the repeat visitor to enter a plurality of votes in polls, and, after permitting the repeat visitor to enter the plurality of votes, analyze the plurality of votes to limit the browser to a predefined number of votes within a specified time period, wherein the website server saves the browser tag, a date, and a time associated with each of the votes entered, wherein the first, second, third, fourth, fifth and sixth program instructions are stored on the computer readable storage media for execution by the CPU via the computer readable memory.

16. The computer system of claim 15, further comprising:

seventh program instructions to receive, by the website server, the browser tag from the browser tag tool;

eighth program instructions to grant the browser access to the service; and ninth program instructions to store a record comprising: an action taken by the browser during using the service, the browser tag, and a time the action was taken; and tenth program instructions to create the browser tag in the browser tag tool based on forwarded parameters of the browser information, including the operating system type of the browser, the browser type of the browser, and whether cookies are enabled or not for the browser, which data received from the website server indicates which parameters are to be used to create the browser tag.

17. The computer system of claim 16, wherein the creating further comprises:

determining, for each forwarded parameter, a value of the browser corresponding to that forwarded parameter;

comparing the determined value for each forwarded parameter with a plurality of possible values in a data structure for each forwarded parameter, wherein the data structure is comprised of exemplary values for respective ones of the forwarded parameters of the browser information;

determining a code from the data structure for the browser for each forwarded parameter; and combining the determined codes for each forwarded parameter into a numerical string of data to form the browser tag.

18. The computer system of claim 17, wherein the browser tag includes the determined codes for at least one of the operating system type of the browser, the browser type and whether cookies are enabled or not for the browser.

19. The computer system of claim 15, wherein the website server is separate from and in communication with the browser tag tool, the website server is further configured to receive a request from the browser to register at the website and determine whether the browser voted more than the predefined number of times within the specified time period, the browser information includes a name, a username, a password, a mailing address, an email address, a telephone number, and a Completely Automated Public Turing test to tell Computers and Humans Apart (CAPTCHA) response, the polls comprise online voting, and the browser tag is saved in real time.

20. The computer system of claim 15, further comprising program instructions to determine how frequently the browser is registering with the website and/or how frequently the browser is utilizing services provided by the website using a record that the browser is previously registered with the website and other data including date and time of registering with the website.

* * * * *